US012657292B2

(12) United States Patent
Kim et al.

(10) Patent No.: US 12,657,292 B2
(45) Date of Patent: Jun. 16, 2026

(54) SYSTEM AND METHOD FOR AUTOMATICALLY GENERATING PLAYBOOK AND VERIFYING VALIDITY OF PLAYBOOK BASED ON ARTIFICIAL INTELLIGENCE

(71) Applicant: Korea Internet & Security Agency, Naju-si (KR)

(72) Inventors: Do Won Kim, Naju-si (KR); Tae Eun Kim, Naju-si (KR); Ki Jong Son, Naju-si (KR); Sae Woom Lee, Naju-si (KR); Seul Ki Choi, Naju-si (KR); Tae Hyeon Kim, Naju-si (KR); Gyeong Jin Na, Naju-si (KR)

(73) Assignee: Korea Internet & Security Agency, Naju-si (KR)

( * ) Notice: Subject to any disclaimer, the term of this patent is extended or adjusted under 35 U.S.C. 154(b) by 317 days.

(21) Appl. No.: 18/385,388

(22) Filed: Oct. 31, 2023

(65) Prior Publication Data

US 2024/0152604 A1 May 9, 2024

(30) Foreign Application Priority Data

Nov. 9, 2022 (KR) ........................ 10-2022-0148494

(51) Int. Cl.
*G06F 21/55* (2013.01)
*G06N 5/025* (2023.01)
(52) U.S. Cl.
CPC ........... *G06F 21/552* (2013.01); *G06N 5/025* (2013.01); *G06F 2221/034* (2013.01)

(58) Field of Classification Search
CPC ............. G06F 21/552; G06F 2221/034; G06F 21/6218; G06F 18/217; G06F 16/951;
(Continued)

(56) References Cited

U.S. PATENT DOCUMENTS 11,637,862 B1 * 4/2023 Sopan .................... G06N 20/00
726/23
11,894,981 B1 * 2/2024 Bharathram ............ H04L 41/14
(Continued)

FOREIGN PATENT DOCUMENTS

KR     102198104 B1 *   1/2021
KR     10-2419451 B1    7/2022
KR     10-2433831 B1    8/2022

OTHER PUBLICATIONS

Office Action of Korean Patent Application No. 10-2022-0148494 dated Aug. 16, 2024.
(Continued)

*Primary Examiner* — Catherine Thiaw
(74) *Attorney, Agent, or Firm* — Revolution IP, PLLC

(57) ABSTRACT

Disclosed are a system and method for automatically generating a playbook and verifying validity of a playbook based on artificial intelligence, wherein the system present invention includes a system for automatically generating a playbook that automatically generates the playbook, and a system for verifying validity of a playbook that is connected to the system for automatically generating a playbook through a network to perform the verification of the validity on the playbook received from the system for automatically generating a playbook.

12 Claims, 5 Drawing Sheets

(58) Field of Classification Search
CPC ...... G06F 3/0482; G06N 5/025; G06N 5/047;
G06N 5/04; H04L 63/1466; H04L
63/1441; H04L 43/28; H04L 41/14; H04L
63/1425
See application file for complete search history.

(56) References Cited

U.S. PATENT DOCUMENTS

| | | | |
|---|---|---|---|
| 12,028,368 B1 * | 7/2024 | Cohen ................. | G06F 21/6218 |
| 12,088,609 B1 * | 9/2024 | Boteanu .............. | H04L 63/1425 |
| 2021/0273961 A1 * | 9/2021 | Humphrey ............ | H04L 43/028 |
| 2021/0306352 A1 * | 9/2021 | Narula ..................... | G06N 5/04 |
| 2021/0377307 A1 * | 12/2021 | Santana De Oliveira ................... | |
| | | | G06F 18/217 |
| 2021/0398001 A1 * | 12/2021 | Forte ....................... | G06N 5/047 |
| 2023/0120174 A1 * | 4/2023 | Seck ..................... | G06F 21/566 |
| | | | 726/25 |
| 2023/0319071 A1 * | 10/2023 | Durbin ................ | H04L 63/1466 |
| | | | 726/23 |
| 2023/0328075 A1 * | 10/2023 | Almasan ............. | H04L 63/1416 |
| 2024/0135001 A1 * | 4/2024 | Madala ................. | G06F 21/577 |

OTHER PUBLICATIONS

Office Action of Korean Patent Application No. 10-2022-0148494
dated Dec. 21, 2024.

* cited by examiner

SYSTEM AND METHOD FOR AUTOMATICALLY GENERATING PLAYBOOK AND VERIFYING VALIDITY OF PLAYBOOK BASED ON ARTIFICIAL INTELLIGENCE

BACKGROUND

1. Field of the Invention

The present invention relates to a system and method for automatically generating a playbook of a security orchestration, automation and response (SOAR) system with guaranteed reliability and verifying validity of a playbook.

2. Discussion of Related Art

Recently, cyber attacks have been increasing in frequency and sophistication, and threats that occurred in past operating systems, PC terminals, and the like are expanding to all devices (Internet of Things) connected to the Internet, and large-scale security events are being collected through various security solutions.

Typically, in a security control environment, it takes approximately 10 minutes or more on average for control personnel to analyze one security threat event, and an additional time is required depending on the importance of the security threat.

Due to this manual analysis by the control personnel, the workload of the control personnel is excessively increasing as repeated analysis and response activities increase, and since know-how, experience, and the like of each control personnel are different, the time required for analysis and response is different, so it is difficult for the control personnel to carry out a consistent response.

To cope with these difficulties, recent security control centers tend to introduce a security orchestration, automation and response (SOAR) system that automates analysis and response tasks using a playbook.

However, as attacks of attackers become more sophisticated and diverse, the playbook of the SOAR system also needs to be updated to keep up with the trend.

For example, when the playbook of the automated SOAR system fails to properly detect the attacks of the attacker, fatal security problems may occur. Therefore, there is a need to verify the extent to which the playbook is valid while updating the playbook of the SOAR system.

RELATED ART DOCUMENT

Patent Document (Patent Document 1): Korean Patent No. 10-2198104 (Registered Date: Dec. 28, 2020): Playbook Automatic Generation System Using Machine Learning and Method Thereof

SUMMARY OF THE INVENTION

The present invention provides a system and method for automatically generating a playbook by advancing and updating the playbook using an artificial intelligence model in accordance with a trend of security threats.

In addition, the present invention provides a system and method for automatically updating a previously installed playbook in accordance with a trend of security threats or verifying validity of a previously installed playbook.

According to an exemplary embodiment, a system for automatically generating a playbook and verifying validity of a playbook based on artificial intelligence includes a system for automatically generating a playbook that automatically generates the playbook, and a system for verifying validity of a playbook that is connected to the system for automatically generating a playbook through a network to perform the verification of the validity on the playbook received from the system for automatically generating a playbook.

The system for automatically generating a playbook may include a template generation module that extracts analysis response action from response history data for each security threat event, extracts action order information for each security threat event from the extracted analysis response action, and generates a tag-based playbook template through learning of an artificial intelligence model based on the extracted action order information, an analysis response advancement module applies results of analyzing external cyber threat intelligence (CTI) information and internal asset information to the generated playbook template to generate analysis response procedure advancement information in which a threat analysis response procedure for at least one playbook is updated, and a component matching module that extracts at least one component for actually performing the analysis response action from response activities included in the generated analysis response procedure advancement information and generates an updated playbook through matching the extracted at least one component with the analysis response action.

The analysis response enhancement module may extract rule-based first tactics, techniques, procedures (TTP) information or extract second TTP information through the artificial intelligence model depending on whether the external CTI information is structured data, and generate analysis response procedure information on the security threat event through connectivity analysis between the extracted first TTP information and second TTP information.

The system for automatically generating a playbook may further include an internal asset identification module that confirms and identifies a threat factor through software resource inquiry included in the internal asset information.

The analysis response advancement module may generate the analysis response procedure advancement information using the identified threat factor, the generated playbook template, and the generated analysis response procedure information.

The system for automatically generating a playbook may further include an adaptive playbook generation module that extracts a rule feature from playbook execution history information and generates an adaptive playbook by evaluating the playbook depending on whether to apply a rule based on the extracted rule feature.

The system for automatically generating a playbook may include a component order verification module that extracts first playbook information subject to verification from the updated playbook or the adaptive playbook, extracts playbook action information from the extracted first playbook information, searches for a similar playbook based on the extracted playbook action information, and converts the found similar playbook into a graph to verify a component arrangement order in the at least one component matching the playbook action information through similarity comparison with the first playbook information, and a playbook feasibility verification module that analyzes exchangeability and an input/output type between the at least one component to confirm input/output data connectivity, and verifies feasibility of the first playbook information based on the confirmed input/output data connectivity.

The system for verifying validity of a playbook may further include a validity verification analysis module that performs execution simulation by searching for a security threat event to be processed by the first playbook information when a verification result by the component order verification module and a verification result by the playbook feasibility verification module satisfy a preset validity threshold, and determines that the verification of the validity of the first playbook information is completed when a result of the performed execution simulation satisfies a preset evaluation value.

The validity verification analysis module may re-operate the component order verification module and the playbook feasibility verification module to adjust the first playbook information when the verification result by the component order verification module and the verification result by the playbook feasibility verification module do not satisfy a preset validity threshold, and the result of the performed execution simulation does not satisfy the preset evaluation value.

According to another exemplary embodiment, a method of automatically generating a playbook and verifying validity of a playbook based on artificial intelligence includes (a) extracting, by a system for automatically generating a playbook, analysis response action from response history data for each security threat event, extracting action order information for each security threat event from the extracted analysis response action, and generating a tag-based playbook template through learning of an artificial intelligence model based on the extracted action order information, (b) applying, by the system for automatically generating a playbook, a result of analyzing external cyber threat intelligence (CTI) information and internal asset information to the generated playbook template to generate analysis response procedure advancement information in which a threat analysis response procedure for at least one playbook is updated, and (c) extracting, by the system for automatically generating a playbook, at least one component for actually performing the analysis response action from response activities included in the generated analysis response procedure advancement information and generating an updated playbook through matching the extracted at least one component with the analysis response action.

The (b) may include (b-1) extracting rule-based first tactics, techniques, procedures (TTP) information or extracting second TTP information through the artificial intelligence model depending on whether the external CTI information is structured data, and (b-2) generating analysis response procedure information on a security threat event through connectivity analysis between the extracted first TTP information and second TTP information.

The (b) may further include (b-3) confirming and identifying, by the system for automatically generating a playbook, a threat factor through software resource inquiry included in the internal asset information, and (b-4) generating the analysis response procedure advancement information using the identified threat factor, the generated playbook template, and the generated analysis response procedure information.

The method of automatically generating a playbook may further include (d) extracting, by the system for automatically generating a playbook, a rule feature from playbook execution history information and generating an adaptive playbook by evaluating the playbook depending on whether to apply a rule based on the extracted rule feature.

The method of verifying validity may further include (e) extracting, by the system for verifying validity of a playbook, first playbook information subject to verification from the updated playbook or the adaptive playbook, extracting playbook action information from the extracted first playbook information, searching for a similar playbook based on the extracted playbook action information, and converting the found similar playbook into a graph to verify a component arrangement order in the at least one component matching the playbook action information through similarity comparison with the first playbook information, and (f) analyzing, by the system for verifying validity of a playbook, exchangeability and an input/output type between the at least one component to confirm input/output data connectivity, and verifying feasibility of the first playbook information based on the confirmed input/output data connectivity.

The method of verifying validity may further include (g) performing, by the system for verifying validity of a playbook, execution simulation by searching for a security threat event to be processed by the first playbook information when a verification result by the (e) and a verification result by the (f) satisfy a preset validity threshold, and determining that the verification of the validity of the first playbook information is completed when a result of the performed execution simulation satisfies a preset evaluation value.

The method of verifying validity may further include (h) re-performing the (e) and (f) to adjust the first playbook information when the verification result by the (e) and the verification result by the (f) do not satisfy a preset validity threshold, and the result of the performed execution simulation does not satisfy the preset evaluation value.

DETAILED DESCRIPTION OF EXEMPLARY EMBODIMENTS

Terms used in the specification are used to describe embodiments, and are not intended to restrict and/or limit the disclosed invention. For example, in the present specification, singular forms may include plural forms unless the context clearly indicates otherwise. In particular, in the following, each system and security threat event as data is expressed in the singular, but should be understood to mean a plural number in practice.

In addition, terms such as "include" and the like are intended to express the presence of features, numbers, steps, operations, components, parts, or combinations thereof described in the specification, and the possibility of additional presence or addition of one or more other features, numbers, steps, operations, components, parts or combinations thereof is not excluded.

In addition, terms including an ordinal number, such as "first" or the like, are used to distinguish one component from other components and do not refer to the one component.

In addition, the term "module" may refer to a unit that processes at least one function or operation. For example, the term "module" may refer to at least one piece of hardware such as field-programmable gate array (FPGA)/application specific integrated circuit (ASIC), at least one piece of software stored in memory, or at least one process processed by a processor.

Hereinafter, embodiments of the disclosed invention will be described in detail with reference to each of the accompanying drawings.

Figure 1:
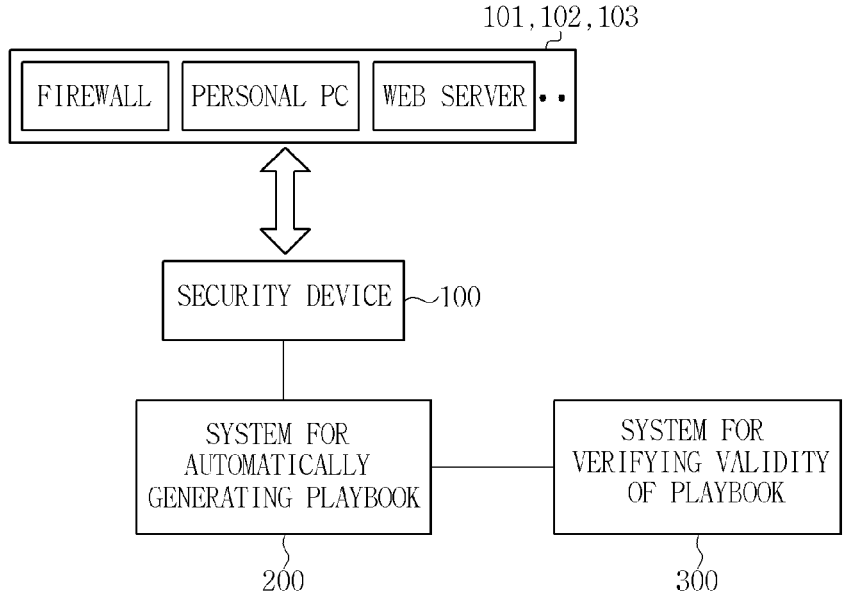
FIG. 1 is a diagram schematically illustrating a system for automatically generating a playbook and verifying validity of the playbook according to an embodiment of the present invention.

FIG. 1 is a diagram schematically illustrating a system for automatically generating a playbook and verifying validity of the playbook according to an embodiment of the present invention.

Referring to FIG. 1, the system according to the embodiment includes at least one security device 100 that is connected to a firewall 101, a personal PC 102, and a web server 103 through a network, a system 200 for automatically generating a playbook that is connected to the at least one security device 100 through an internal network (network in a narrow sense, in-house network), and a system 300 for verifying validity of a playbook that is connected to the system 200 for automatically generating a playbook through the internal network (network in a narrow sense, in-house network).

The network disclosed refers to a connection structure that allows information exchange between each node connected between the firewall 101, the personal PC 102, the web server 103, etc., and the security device 100. Examples of such networks may include a local area network (LAN) and a wired data communication network in a narrow sense, and a wide area network (WAN), an Internet network (World Wide Web (WWW)), a wireless broadband (WiBro) network, and a mobile communication network in a broad sense, but are not necessarily limited thereto. On the other hand, the in-house network may be the above-described network in a narrow sense, or may simply be a wired communication network.

In an embodiment, at least one security device 100 may detect security threat events collected from the firewall 101, the personal PC 102, the web server 103, etc., in real time.

The at least one security device 100 may include enterprise security management (ESM), security information & event management (SIEM), an intrusion detection system (IDS), and a machine learning solution, but is not necessarily limited thereto.

Here, the ESM is an integrated security management system that gathers logs and events from security solutions such as a firewall, an intrusion prevention system (IPS) (intrusion detection system (IDS)), and unified threat management (UTM), and may perform functions such as integrated management of integrated solutions and interconnection between solutions, the SIEM is a system in which security information management (SIM) and security event management (SEM) are combined and has an evolved form of enterprise security management (ESM), and may refer to an integrated security control solution that collects logs and events occurring in a wide range such as various types of server equipment, network equipment, and application programs installed on a computer, and blocks threats in advance through big data-based correlation analysis.

In an embodiment, the system 200 for automatically generating a playbook may operate playbooks matching the security threat events collected from the security device 100 according to the execution procedure to automatically perform analysis response to the security threat events. When the system 200 for automatically generating a playbook operates by setting a playbook according to a predefined execution procedure, etc., the system 200 may automatically generate a playbook by newly updating the playbook using an artificial intelligence model whenever a security threat newly increases later.

The above-described artificial intelligence model may be generated through machine learning, and the machine learning may be performed, for example, in a security control priority support system 300 in which the artificial intelligence is performed, or may be performed through a separate artificial intelligence system. Examples of the artificial intelligence learning algorithm include supervised learning, unsupervised learning, semi-supervised learning, or reinforcement learning, but are not limited to the above examples.

Such an artificial intelligence model may include multiple artificial neural network layers, and the above-described artificial neural network may be a deep-neural network (DNN), a convolutional neural network (CNN), a recurrent neural network (RNN), a restricted boltzmann network (RBM), a deep belief network (DBN), a bidirectional recurrent deep neural network (BRDNN), deep Q-networks, or a combination of two or more of the above networks, but is not limited to the above examples. In addition to hardware structures, the artificial intelligence model may include additional or alternative software structures.

The system 300 for verifying validity of a playbook according to the embodiment may verify the feasibility and normality of the component arrangement with respect to an initial playbook or an updated and automatically generated playbook, and comprehensively verify the validity of the automatically generated playbook based on the verification.

Hereinafter, each configuration of the system 200 for automatically generating a playbook and system 300 for verifying validity of a playbook will be described in more detail.

Figure 2:
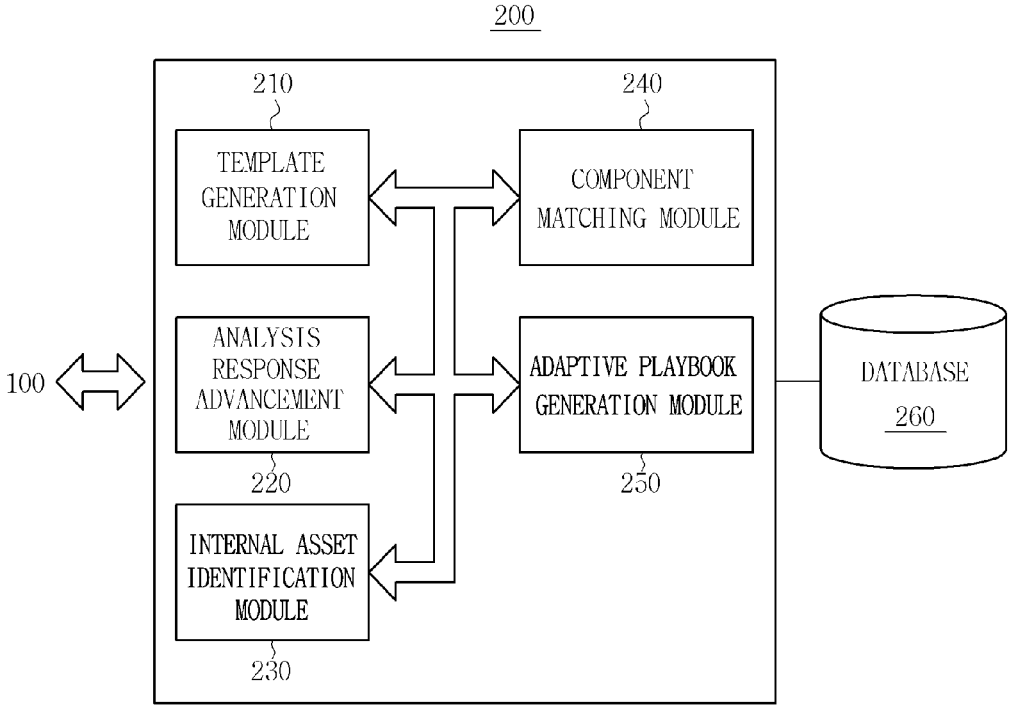
FIG. 2 is a diagram illustrating a configuration of a system for automatically generating a playbook according to an embodiment of the present invention in detail.

FIG. 2 is a diagram illustrating a configuration of the system for automatically generating a playbook according to an embodiment of the present invention in detail.

Referring to FIG. 2, the system 200 for automatically generating a playbook according to the embodiment may include a template generation module 210, an analysis response advancement module 220, an internal asset identification module 230, a component matching module 240, an adaptive playbook generation module 250, and a database 260.

In an embodiment, when response history data, which is a result of processing the security threat events collected from the security device 100, is stored in the database 260, the template generation module 210 may extract analysis response actions for each security threat event from the response history data stored in the database 260.

The above-described response history data may include data acquired through playbook execution, result data analyzed and responded by an analysis automation system (not illustrated), or result data manually analyzed and responded by the control personnel. On the other hand, the analysis response action may refer to execution actions set for each security threat event.

The template generation module 210 may extract action order information for each security threat event from the extracted analysis response action, and generate a tag-based playbook template through training by the artificial intelligence model based on the extracted action order information.

In an embodiment, the analysis response advancement module 220 may call external cyber threat intelligence (CTI) information and internal asset information pre-stored in the database 260. The called internal asset information may include the role of a network system to be protected, an operating system (OS) which is being installed and operated, a software (SW) version, open port information, etc.

Therefore, the analysis response advancement module 220 may analyze the external CTI information and the internal asset information called from the database 260, and apply this analyzed result to the playbook template to generate analysis response procedure advancement information in which a threat analysis response procedure for at least one playbook is updated.

For example, the analysis response advancement module 220 may confirm whether the external CTI information is structured data, extract rule-based first tactics, techniques, procedures (TTP) information from the external CTI information, and apply the external CTI information to the artificial intelligence model to extract second TTP information from the external CTI information.

The analysis response advancement module 220 may generate analysis response procedure information on the security threat event through the connectivity analysis between the extracted first TTP information and second TTP information.

In this case, the above-described connectivity analysis may be MITER D3FEND or MITIGATION ENGAGE, but is not limited thereto.

In an embodiment, the internal asset identification module 230 may call the internal asset information stored in the database 260 and then confirm and identify threat factors by inquiring software resources in the called internal asset information. The above-described software resources may include software inquired from internal asset information, OS information, common vulnerabilities and exposures (CVE) information, common platform enumeration (CPE) information, and common vulnerability scoring system (CVSS) information.

For example, the internal asset identification module 230 in the system 200 for automatically generating a playbook may inquire the SW and OS information, the CP information, the CVE information, and the CVSS information from the internal asset information, and then score threat factors based on the inquired information, thereby identifying the threat factors.

In this way, the analysis response advancement module 220 may generate analysis response procedure advancement information in which the analysis response procedure is updated (advanced) using the identified or generated threat factor, playbook template, and analysis response procedure information as described above.

In an embodiment, the component matching module 240 may call the analysis response action from the template generation module 210, call the analysis response procedure advancement information from the analysis response advancement module 220, and then extract at least one component for actually performing the called analysis response action from the response actions included in the called analysis response procedure advancement information.

Accordingly, the component matching module 240 may generate an updated playbook through matching at least one previously extracted component with the analysis response action extracted by the template generation module 210 and store the generated updated playbook in the database 260.

In an embodiment, the adaptive playbook generation module 250 may call playbook execution history information pre-stored in the database 260 and then extract rule features from the called playbook execution history information, and perform the playbook evaluation based on the extracted rule features, and determine whether to apply the rule determined based on the playbook evaluation result.

For example, when the rule application is necessary, the adaptive playbook generation module 250 may apply a reward function in a direction in which the playbook evaluation result increases, and perform the playbook evaluation by adjusting the playbook based on the playbook execution history data with the goal of the applied reward function.

Accordingly, the adaptive playbook generation module 250 may generate the adaptive playbook information only when the playbook evaluation is completed in the direction in which the above-described reward function is applied and the playbook is adjusted, and thus, the rule application is no longer necessary.

In an embodiment, the database 260 may store data processed by the template generation module 210, the analysis response advancement module 220, the internal asset identification module 230, the component matching module 240, and the adaptive playbook generation module 250, the security threat event data collected from the security device 100, etc.

For example, the database 260 may store data such as external cyber threat intelligence (CTI) information and internal asset information related to external systems or existing history of responding to security threats, and store the adaptive playbook and data processed by the adaptive playbook generation module 250.

This database 260 is a concept that includes a computer-readable recording medium, refers not only to a database in a narrow sense, but also to a database in a broad sense including data records based on a file system, and may be included within the scope of the database referred to in the present invention as long as a simple set of logs may be searched for and data may be extracted.

Figure 3:
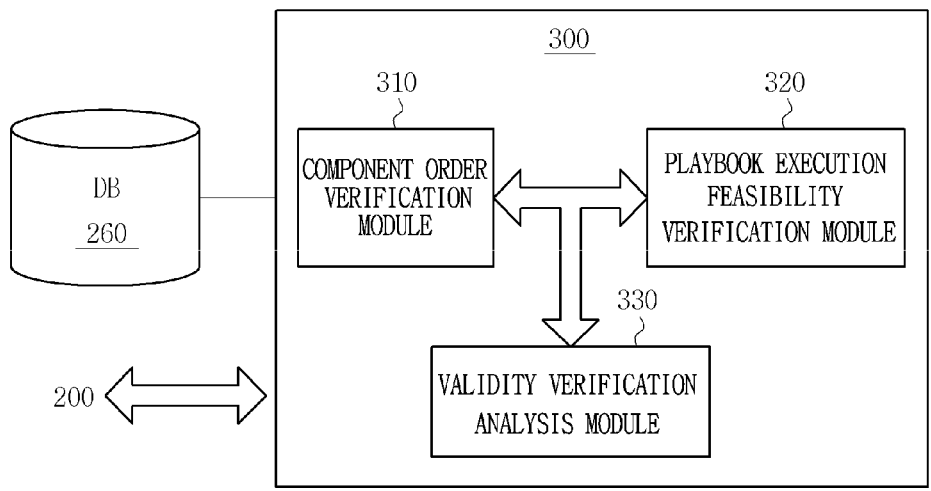
FIG. 3 is a diagram illustrating the configuration of the system for automatically generating a playbook according to the embodiment of the present invention in detail.

FIG. 3 is a diagram illustrating the configuration of the system for automatically generating a playbook according to the embodiment of the present invention in detail.

Referring to FIG. 3, the system 300 for verifying validity of a playbook according to the embodiment may include a component order verification module 310, a playbook feasibility verification module 320, and a validity verification analysis module 330.

In an embodiment, the component order verification module 310 may extract first playbook information subject to verification from the updated playbook or adaptive playbook stored in the database 260 and may extract the playbook action information from the extracted first playbook information.

In this case, the component order verification module 310 may search for a similar playbook based on the extracted playbook action information, convert the found similar playbook into a graph, and then compare the similarity of the converted graph and the first playbook information to verify the component arrangement order within at least one component matching the playbook action information.

In an embodiment, the playbook feasibility verification module 320 may confirm input/output data connectivity between components by calling at least one component matching the analysis response action and analyzing the exchangeability and an input/output type between the at least one called component, and verify the feasibility of the first playbook information based on the confirmed input/output data connectivity.

The validity verification analysis module 330 according to the embodiment may determine whether the verification result by the component order verification module 310 and the verification result by the playbook feasibility verification module 320 satisfy a preset validity threshold.

That is, the validity verification analysis module 330 may perform execution simulation by searching for security threat events that can be processed by the first playbook information when the verification result by the component order verification module 310 and the verification result by the playbook feasibility verification module 320 satisfy the preset validity threshold.

However, when the verification result by the component order verification module 310 and the verification result by the playbook feasibility verification module 320 do not satisfy the set validity threshold, the validity verification analysis module 330 may allow the component order verification module and the playbook feasibility verification module to perform the above-described procedures again to adjust the first playbook information.

Meanwhile, the validity verification analysis module 330 may process the above-described execution simulation and then determine whether the result of the processed execution simulation satisfies a preset evaluation value.

For example, when the result of the performed execution simulation satisfies the preset evaluation value, the validity verification analysis module 330 may determine that the verification of the validity of the first playbook information has been normally completed, and then store the confirmed first playbook in the database 260. Therefore, the first playbook whose validity has been verified may be put into practice.

However, when it is determined that the result of the performed execution simulation does not satisfy the preset evaluation value, the validity verification analysis module 330 may allow the component order verification module and the playbook feasibility verification module to re-perform the above-described procedure in order to adjust the first playbook information as described above.

In this way, according to the present invention, by verifying the validity of the updated or adaptive playbook, it is possible to quickly cope with the trend of changing security threats.

Meanwhile, each component module of the system 200 for automatically generating a playbook and system 300 for verifying validity of a playbook may be substantially processed by at least one processor provided in the controller.

At least one processor may, for example, execute software to control at least one other component (e.g., components such as a validity verification analysis module) and perform various data processing or calculation.

Such at least one processor may, as at least part of data processing or calculation, store instructions or data received from other components in a memory, process instructions or data stored in memory, such as a non-volatile memory, and may store the processing result data in a non-volatile memory, for example. In addition, at least one processor may include a hardware configuration specialized for processing the above-described artificial intelligence model.

Hereinafter, without being limited to each component of the system 200 for automatically generating a playbook and system 300 for verifying validity of a playbook, a method of automatically generating a playbook processed by system 200 for automatically generating a playbook and system 300 for verifying validity of a playbook and verifying validity of a playbook will be described.

In this case, the method of automatically generating and validating a playbook is substantially processed by each controller of the system 200 for automatically generating a playbook and the system 300 for verifying validity of a playbook or at least one processor included therein, but for convenience, this will be described assuming that the method of automatically generating a playbook and verifying validity of a playbook is performed by the system 200 for automatically generating a playbook and the system 300 for verifying validity of a playbook.

Figure 4:
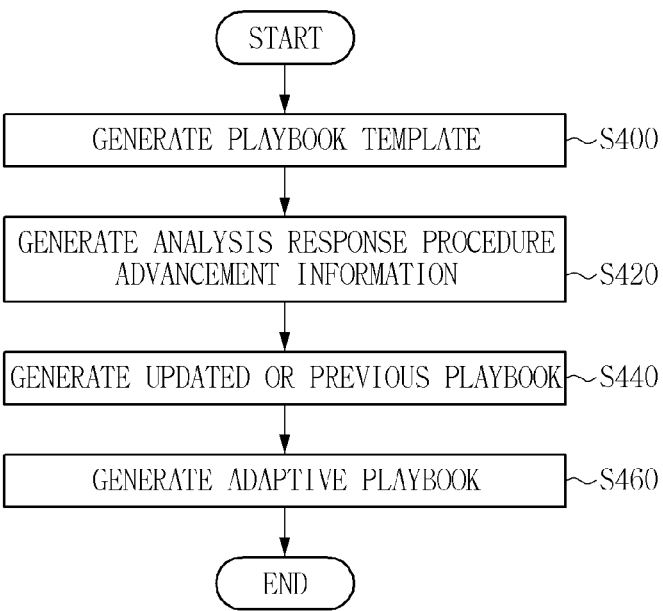
FIG. 4 is a flowchart schematically illustrating a method of automatically generating a playbook processed by the system for automatically generating a playbook according to the embodiment of the present invention.
Figure 5:
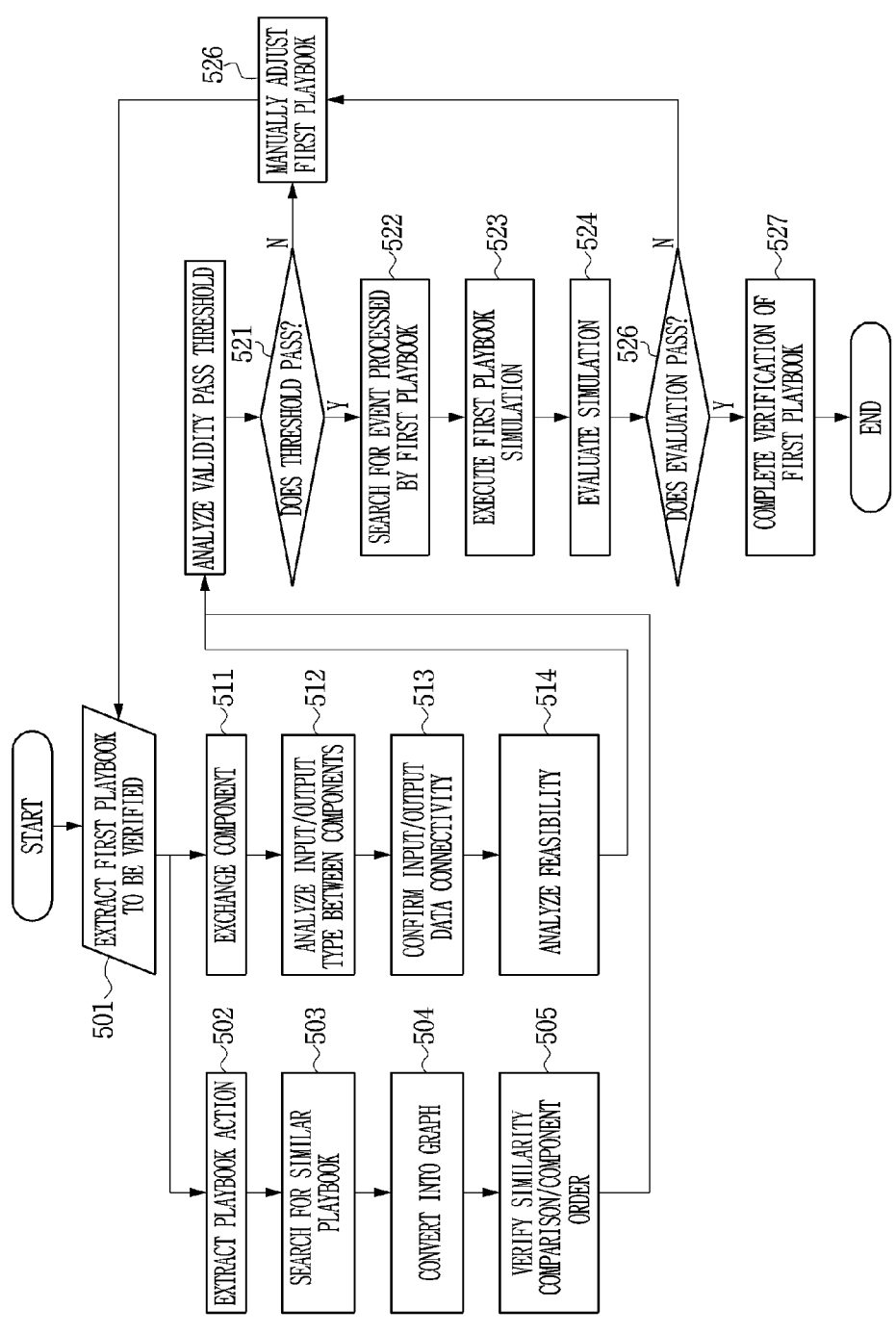
FIG. 5 is a flowchart illustrating the method of automatically generating a playbook in FIG. 4 in detail.

FIG. 4 is a flowchart illustrating in detail the method of automatically generating a playbook processed by the system for automatically generating a playbook according to an embodiment of the present invention, and FIG. 5 is a flowchart illustrating the method of automatically generating a playbook of FIG. 4 in detail.

Referring to FIGS. 4 and 5, the method of automatically generating a playbook based on artificial intelligence according to the embodiment may include operations S400, S420, S440, and S460 performed by the system for automatically generating a playbook to automatically generate a playbook.

In operation S400, the system for automatically generating a playbook according to the embodiment may call (inquire) response history data which is the result of processing the security threat event and pre-stored in the database 260 (401), and then extract analysis response actions for each security threat event from the called response history data (402).

The above-described response history data may include data acquired through playbook execution, result data analyzed and responded by an analysis automation system (not illustrated), or result data manually analyzed and responded by the control personnel. On the other hand, analysis response action information may refer to execution actions set for each security threat event.

Therefore, the system for automatically generating a playbook may extract action order information for each security threat event from the extracted analysis response action (403), and generate a tag-based playbook template through learning of the artificial intelligence model (AI-based) based on the extracted action order information (404).

In operation S420, the system for automatically generating a playbook may call (inquire) the external CTI information and the internal asset information pre-stored in the database 260 (420a). The called internal asset information may include the role of a network system to be protected, an operating system (OS) which is being installed and operated, a software (SW) version, open port information, etc.

Therefore, the system for automatically generating a playbook may analyze the called CTI information and internal asset information and apply the analysis result to the playbook template to generate the analysis response procedure advancement information in which a threat analysis response procedure for at least one playbook is updated.

Looking at this in detail, in operation S420, first, the system for automatically generating a playbook may determine whether the called external CTI information is structured data (421). More specifically, when it is determined that the called external CTI information is structured data, the system for automatically generating a playbook may extract the rule-based first TTP information from the external CTI information (422).

On the other hand, when it is determined that the called external CTI information is not structured data, the system for automatically generating a playbook may extract the second TTP information from the external CTI information by learning of the artificial intelligence model based on the external CTI information (423).

In operation S420, the system for automatically generating a playbook may generate the analysis response procedure information on each security threat event (425) through the connectivity analysis between the extracted first TTP information and second TTP information (424).

In this case, the above-described connectivity analysis may be MITER D3FEND or MITIGATION ENGAGE, but is not limited thereto.

Thereafter, in operation S420, the system for automatically generating a playbook may call (inquire) the internal asset information stored in the database 260 (426), inquire software resources from the called internal asset information (427 and 428), and then score and identify threat factors from the inquired software resources (429 and 430).

The above-described software resources may include software inquired from the internal asset information, the OS information, the CVE information, the CPE information, and the CVSS information.

For example, the system for automatically generating a playbook may inquire the SW and OS information, the CP information, the CVE information, and the CVSS information from the internal asset information (427 and 428), and then score the threat factors based on the inquired information, thereby identifying the threat factors (429 and 430).

Accordingly, in operation S420, the system for automatically generating a playbook may generate the analysis response procedure advancement information in which the analysis response procedure is updated (advanced) using the identified or generated threat factors, the playbook template, and the analysis response procedure advancement information as described above (431).

In operation S440, the system for automatically generating a playbook may call the analysis response action from operation S400, call the analysis response procedure advancement information from operation S420, and then extract at least one component for actually performing the called analysis response action from the response actions included in the called analysis response procedure advancement information.

Thereafter, the system for automatically generating a playbook may generate the tag-based playbook template in operation S400 (404), and, when it is determined that the playbook needs to be strengthened, for example, to be updated (432), may automatically generate the updated playbook (434) through the matching at least one previously extracted component with the analysis response action (433).

However, when it is determined that the playbook needs not to be updated (432), the system for automatically generating a playbook may automatically generate the playbook prior to be the updated (434) through the matching at least one component with the analysis response action (433).

In operation S460, the system for automatically generating a playbook may call (inquire) the playbook execution history information pre-stored in the database 260 (461), extract the rule features from the called playbook execution history information (462), perform the playbook evaluation based on the extracted rule features (463), and determine whether to apply the rule based on the playbook evaluation result (464).

For example, in operation S460, when the rule needs to be applied to the playbook evaluation, the system for automatically generating a playbook may apply a reward function in a direction in which the playbook evaluation result increases (465), and adjust the playbook based on the playbook execution history data with the goal of the applied reward function (466), thereby performing the playbook evaluation (463).

As a result, in operation S460, the system for automatically generating a playbook may generate the adaptive playbook information (467) only when the playbook evaluation is completed in the direction in which the above-described reward function application and playbook adjustment are performed and thus the rule application is no longer necessary. The adaptive playbook information generated thus may be stored in the database 260 (468).

Figure 6:
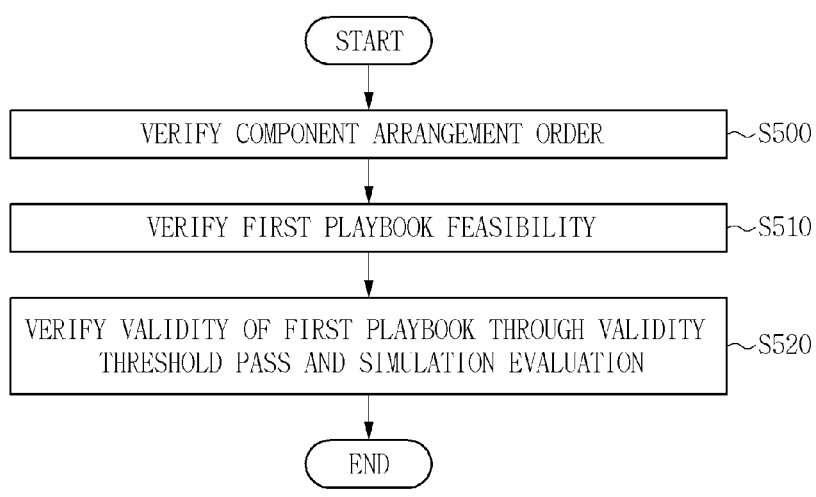
FIG. 6 is a flowchart schematically illustrating the method of automatically generating a playbook processed by the system for automatically generating a playbook according to the embodiment of the present invention.
Figure 7:
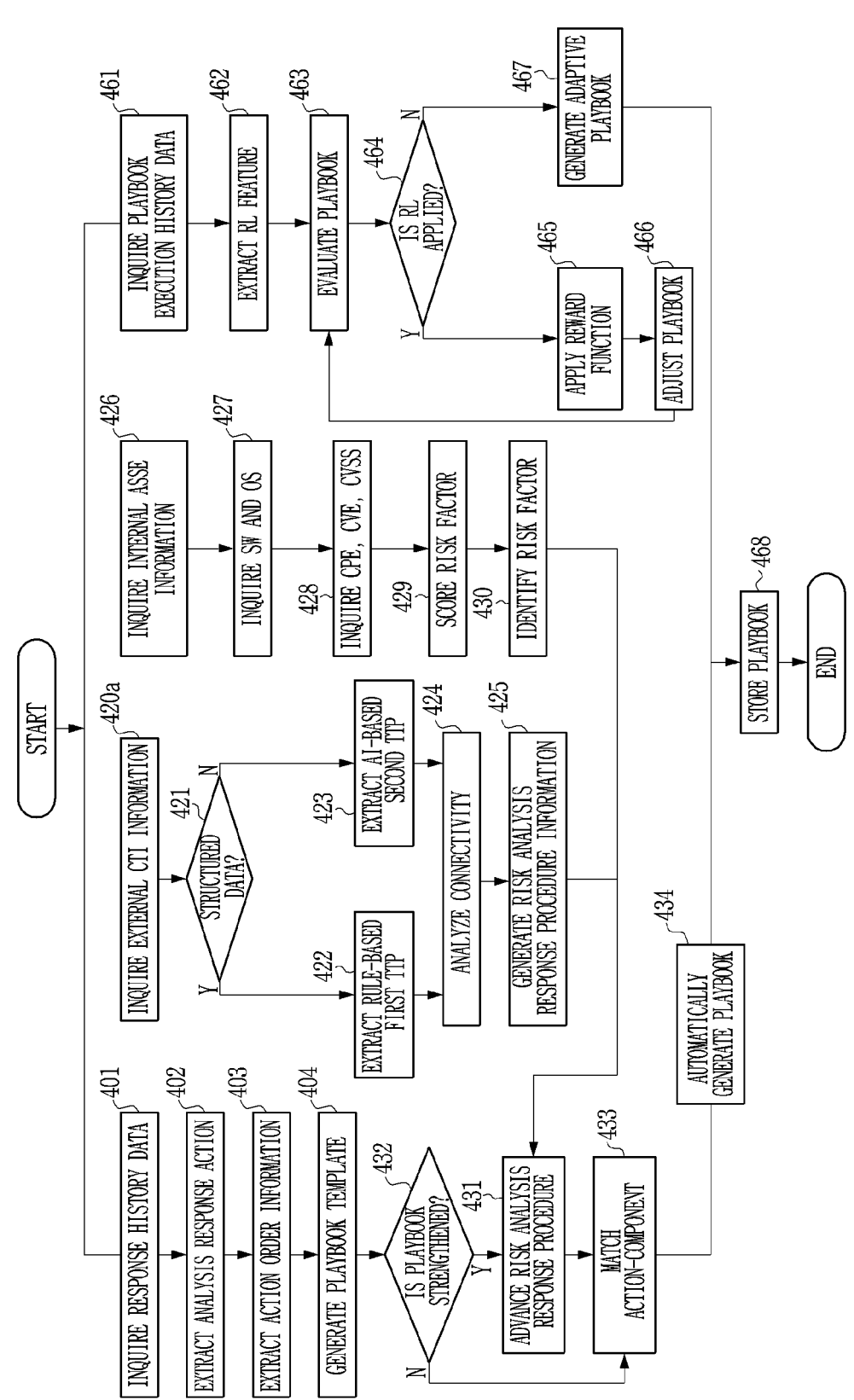
FIG. 7 is a flowchart illustrating the method of automatically generating a playbook in FIG. 6 in detail.

FIG. 6 is a flowchart schematically illustrating the method of automatically generating a playbook processed by the system for automatically generating a playbook according to an embodiment of the present invention, and FIG. 7 is a flowchart illustrating the method of automatically generating a playbook of FIG. 6 in detail.

Referring to FIGS. 6 and 7, the method of verifying validity of a playbook according to the embodiment of the present invention may include operations S500, S510, and S520 by the system for verifying validity of a playbook that call the playbook information required for the verification of the validity of the playbook to verify the validity of the playbook.

In operation S500, the system for verifying validity of a playbook may extract the first playbook information subject to the verification from the updated playbook or the adaptive playbook stored in the database 260 (501), and extract the playbook action information from the extracted first playbook information (502).

In this way, the system for verifying validity of a playbook may search for a similar playbook based on the extracted playbook action information (503), convert the found similar playbook into the graph (504), then compare the similarity between the converted graph with the first playbook information to verify the component arrangement order within at least one component matching the playbook action information (505).

In operation S510, the system for verifying validity of a playbook may confirm input/output data connectivity between components (513) by calling at least one component matching the analysis response action and analyzing the exchangeability and an input/output type between the at least one called component (511 and 512), and verify the feasibility of the first playbook information based on the confirmed input/output data connectivity (514).

In operation S520, the system for verifying validity of a playbook may perform a validity pass threshold analysis of the verification result in operation S500 and the verification result in operation S510 as described above.

That is, the system for verifying validity of a playbook may determine whether the verification result in operation S500 and the verification result in operation S510 satisfy (pass) the preset validity threshold (521).

For example, when it is determined that the verification result in operation S500 and the verification result in operation S510 satisfy (pass) the preset validity threshold (521), the system for verifying validity of a playbook may perform the execution simulation by searching for the security threat events that can be processed by the first playbook information (523 and 524).

However, when it is determined that the verification result in operation S500 and the verification result in operation S510 do not satisfy the set validity threshold, the system for verifying validity of a playbook may re-perform operations S500 and S510 to adjust the first playbook information (525).

In operation S520, the system for verifying validity of a playbook may process the above-described execution simulation and then determine whether the result of the processed execution simulation satisfies the preset evaluation value (526).

For example, when it is determined that the result of the performed (processed) execution simulation satisfies the preset evaluation value, the system for verifying validity of a playbook may determine that the verification of the validity of the first playbook information has been normally completed (527), and then store the determined first playbook in the database 260. Therefore, the first playbook whose validity has been verified may be put into practice.

However, when it is determined that the result of the performed execution simulation does not satisfy the preset evaluation value, system for verifying validity of a playbook allows the component order verification module and the playbook feasibility verification module to re-perform the above-described procedure in order to adjust the first playbook information as described above.

In this way, according to the present invention, by verifying the validity of the updated or adaptive playbook, it is possible to quickly cope with the trend of changing security threats.

The above-described method according to the present invention may be implemented in the form of program commands that may be executed through various components and may be recorded on a computer-readable recording medium. The computer-readable recording medium may include a combination or one of a program command, a data file, a data structure, and the like. The program commands recorded in the computer-readable recording medium may be especially designed and constituted for the present invention or be known to those skilled in a field of computer software. Examples of the computer-readable recording medium may include a magnetic medium such as a hard disk, a floppy disk, or a magnetic tape, an optical recording medium such as a compact disk read only memory (CD-ROM) or a digital versatile disk (DVD), a magneto-optical medium such as a floptical disk, and a hardware device specially configured to store and execute program commands, such as a read only memory (ROM), a random access memory (RAM), a flash memory, or the like. Examples of the program commands include a high-level language code to be executed by a computer using an interpreter, or the like, as well as a machine language code made by a compiler. The above-described hardware device may be constituted to be operated as one or more software modules to perform processing according to the present disclosure, and vice versa.

As described above, according to an embodiment of the present invention, by learning an arbitrary process through an artificial intelligence model and then strengthening and updating analysis response capability of a playbook, it is possible to automatically generate the updated playbook and an adaptive playbook with a high level of completeness in the analysis response.

In addition, according to the present invention, by setting an initially defined playbook as learning data and then re-learning a newly generated process to update and automatically generate the playbook, it is possible to quickly cope with a trend of security threats.

In addition, according to the present invention, by reducing costs and errors due to the generation and update of a playbook to respond to new security threats, it is possible to quickly cope with a trend of security threats.

In addition, according to the present invention, by verifying validity of an updated or adaptive playbook, it is possible to quickly cope with a flow of changing security threats.

The present invention is not limited to the above-described effects, and other effects that are not described may be clearly understood by those skilled in the art from the description below.

Meanwhile, although the present invention has been described by embodiments and drawings limited to specific details such as specific components according to the above-described embodiments of the present invention, they have been provided only for assisting in the entire understanding of the present invention. Therefore, the present invention is not limited to the embodiments. Various modifications and changes may be made by those skilled in the art to which the present invention pertains from this description.

Therefore, the idea described in the present invention should not be limited to the above-described embodiments. In addition, not only the scope of the patent claims described below, but also all modifications equal to or equivalent to the scope of this patent claim fall within the scope of the spirit of the present invention.

What is claimed is:

1. A system for automatically generating a playbook and verifying validity of the playbook based on artificial intelligence, the system comprising:
a first computing system for automatically generating the playbook; and
a second computing system for verifying the validity of the playbook that is connected to the first computing system through a network to perform verification of the validity on the playbook received from the first computing system, wherein the first computing system includes modules implemented as software stored in a memory and executed by a processor, comprising:
a template generation module that extracts analysis response action from response history data for each security threat event, extracts action order information for each security threat event from the extracted analysis response action, and generates a tag-based playbook template through learning of an artificial intelligence model based on the extracted action order information;
an analysis response advancement module that applies results of analyzing external cyber threat intelligence (CTI) information and internal asset information to the generated playbook template to generate analysis response procedure advancement information in which a threat analysis response procedure for at least one playbook is updated, wherein the internal asset information includes a role of a network system to be protected, an operating system which is being installed and operated, a software version, and open port information; and a component matching module that extracts at least one component configured to perform the analysis response action from response activities included in the generated analysis response procedure advancement information, and generates an updated playbook by matching the extracted at least one component with the analysis response action, and wherein the second computing system includes modules implemented as software stored in a memory and executed by a processor, comprising:

a component order verification module configured to verify an arrangement order of the at least one component which is matched with the analysis response action in the playbook;

a playbook feasibility verification configured to verify feasibility of the playbook based on input/output data connectivity; and a validity verification analysis module configured to repeat verification of the arrangement order of the at least one component and verification of the feasibility of the playbook based on the input/output data connectivity, to adjust the playbook, by using the component order verification module and the playbook feasibility verification module, when a verification result by the component order verification module and a verification result by the playbook feasibility verification module do not satisfy a preset validity threshold.

2. The system of claim 1, wherein the analysis response advancement module extracts rule-based first tactics, techniques, procedures (TTP) information or extracts second TTP information through the artificial intelligence model depending on whether the external CTI information is structured data, and generates analysis response procedure information on the security threat event through connectivity analysis between the extracted first TTP information and second TTP information.

3. The system of claim 2, wherein the first computing system further includes an internal asset identification module that confirms and identifies a threat factor through software resource inquiry included in the internal asset information, and the analysis response advancement module generates the analysis response procedure advancement information using the identified threat factor, the generated playbook template, and the generated analysis response procedure information.

4. The system of claim 1, wherein the first computing system further includes an adaptive playbook generation module that extracts a rule feature from playbook execution history information and generates an adaptive playbook by evaluating the playbook depending on whether to apply a rule based on the extracted rule feature.

5. The system of claim 4, wherein the component order verification module extracts first playbook information subject to verification from the updated playbook or the adaptive playbook, extracts playbook action information from the extracted first playbook information, searches for a similar playbook based on the extracted playbook action information, and converts the found similar playbook into a graph to verify a component arrangement order in the at least one component matching the playbook action information through similarity comparison with the first playbook information, and the playbook feasibility verification module analyzes exchangeability and an input/output type between the at least one component to confirm input/output data connectivity, and verifies feasibility of the first playbook information based on the confirmed input/output data connectivity.

6. The system of claim 5, wherein the validity verification analysis module performs execution simulation by searching for a security threat event to be processed by the first playbook information when the verification result by the component order verification module and the verification result by the playbook feasibility verification module satisfy the preset validity threshold, and determines that the verification of the validity of the first playbook information is completed when a result of the performed execution simulation satisfies a preset evaluation value.

7. A method of automatically generating a playbook and verifying validity of the playbook based on artificial intelligence, the method comprising:

extracting, by a first computing system for automatically generating the playbook, analysis response action from response history data for each security threat event, extracting action order information for each security threat event from the extracted analysis response action, and generating a tag-based playbook template through learning of an artificial intelligence model based on the extracted action order information;

applying, by the first computing system, a result of analyzing external cyber threat intelligence (CTI) information and internal asset information to the generated playbook template to generate analysis response procedure advancement information in which a threat analysis response procedure for at least one playbook is updated, wherein the internal asset information includes a role of a network system to be protected, an operating system which is being installed and operated, a software version, and open port information; and extracting, by the first computing, at least one component configured to perform the analysis response action from response activities included in the generated analysis response procedure advancement information and generating an updated playbook through matching the extracted at least one component with the analysis response action;

verifying, by a second computing system for verifying the validity of the playbook, an arrangement order of the at least one component which is matched with the analysis response action in the playbook;

verifying, by the second computing system, feasibility of the playbook based on input/output data connectivity; and repeating, by the second computing system, verification of the arrangement order of the at least one component and verification of the feasibility of the playbook based on the input/output data connectivity, in order to adjust the playbook, when a result by the verifying of the arrangement order and a result by the verifying of the feasibility do not satisfy a preset validity threshold.

8. The method of claim 7, wherein the applying of the result includes: extracting rule-based first tactics, techniques, procedures (TTP) information or extracting second TTP information through the artificial intelligence model depending on whether the external CTI information is structured data; and generating analysis response procedure information on a security threat event through connectivity analysis between the extracted first TTP information and second TTP information.

9. The method of claim 8, wherein the applying of the result further includes: confirming and identifying a threat factor through software resource inquiry included in the internal asset information; and generating the analysis response procedure advancement information using the identified threat factor, the generated playbook template, and the generated analysis response procedure information.

10. The method of claim 7, further comprising extracting, by the first computing system, a rule feature from playbook execution history information and generating an adaptive playbook by evaluating the playbook depending on whether to apply a rule based on the extracted rule feature.

11. The method of claim 10, further comprising: extracting, by the second computing system, first playbook information subject to verification from the updated playbook or the adaptive playbook, extracting playbook action information from the extracted first playbook information, searching for a similar playbook based on the extracted playbook action information, and converting the found similar playbook into a graph to verify a component arrangement order in the at least one component matching the playbook action information through similarity comparison with the first playbook information; and analyzing, by the second computing system, exchangeability and an input/output type between the at least one component to confirm input/output data connectivity, and verifying feasibility of the first playbook information based on the confirmed input/output data connectivity.

12. The method of claim 11, further comprising: performing, by the second computing system, execution simulation by searching for a security threat event to be processed by the first playbook information when the result by the verifying of the arrangement order and the result by the verifying of the feasibility satisfy the preset validity threshold, and determining that the verification of the validity of the first playbook information is completed when a result of the performed execution simulation satisfies a preset evaluation value.

* * * * *